(12) United States Patent  (10) Patent No.: US 7,712,674 B1
Warner et al. (45) Date of Patent: May 11, 2010

(54) RFID DEVICES FOR VERIFICATION OF CORRECTNESS, RELIABILITY, FUNCTIONALITY AND SECURITY

(75) Inventors: Robert Warner, Holmdel, NJ (US); Jack Winters, Middletown, NJ (US); Bruce McNair, Holmdel, NJ (US)

(73) Assignee: Eigent Technologies LLC, Holmdel, NJ (US)

( * ) Notice: Subject to any disclaimer, the term of this patent is extended or adjusted under 35 U.S.C. 154(b) by 1055 days.

(21) Appl. No.: 11/359,268

(22) Filed: Feb. 22, 2006

Related U.S. Application Data

(60) Provisional application No. 60/655,010, filed on Feb. 22, 2005, provisional application No. 60/676,710, filed on May 2, 2005.

(51) Int. Cl.
*G06K 19/06* (2006.01)
*G06K 19/00* (2006.01)
*H04Q 5/22* (2006.01)
*G08B 13/14* (2006.01)

(52) U.S. Cl. .................. 235/492; 235/487; 235/493; 340/10.1; 340/572.1

(58) Field of Classification Search ............... 235/487, 235/492, 493; 340/572.1, 10.1
See application file for complete search history.

(56) References Cited

U.S. PATENT DOCUMENTS

| | | | | |
|---|---|---|---|---|
| 5,406,263 | A | | 4/1995 | Tuttle ................ 340/572.1 |
| 5,646,592 | A | * | 7/1997 | Tuttle ................ 340/545.6 |
| 5,804,810 | A | * | 9/1998 | Woolley et al. ............ 235/492 |
| 5,828,753 | A | | 10/1998 | Davis .................... 713/189 |
| 5,831,531 | A | | 11/1998 | Tuttle ................ 340/568.2 |
| 5,920,690 | A | | 7/1999 | Moyer et al. .................. 726/1 |
| 6,050,622 | A | * | 4/2000 | Gustafson .............. 292/307 R |
| 6,097,225 | A | | 8/2000 | Smith .................... 327/143 |
| 6,107,920 | A | | 8/2000 | Eberhardt et al. ........ 340/572.7 |
| 6,112,940 | A | | 9/2000 | Canella ................... 221/198 |
| 6,135,291 | A | | 10/2000 | Canella ................... 209/573 |
| 6,140,146 | A | | 10/2000 | Brady et al. ................ 438/62 |
| 6,164,551 | A | | 12/2000 | Altwasser ................. 235/492 |

(Continued)

FOREIGN PATENT DOCUMENTS

WO  PCT/SG2004000389  * 12/2009

*Primary Examiner*—Daniel Walsh
(74) *Attorney, Agent, or Firm*—Porzio, Bromberg & Newman, P.C.

(57) ABSTRACT

The present invention differs from the prior art in that the present invention provides one or a network of passive or active radio frequency identification (RFID) transceivers and antenna elements in different numbers, in various network sizes, in different configurations and on various substrates. The RFID transceiver can be co-located with standard semiconductor devices, for cost-effective circuit design and non-destructive fabrication test and analysis of integrated circuits and printed circuit boards after fabrication, and to locate, track and identify the integrated circuit, printed circuit boards and products in which they are implemented. The RFID transceivers can be coupled to substrates containing matter in gas, liquid, or solid form, such as medical devices like breast implants, for effective monitoring of the substrates to ensure that the substrate is in an unaltered state and the matter is still contained securely within. The RFID transceivers can be coupled to secure tapes of various lengths and widths and mesh bags or sheets of various sizes and they can be applied at the carton-level using them to locate, track and identify the integrated circuit, printed circuit boards and products in which they are implemented and/or the cartons in which they were placed.

10 Claims, 14 Drawing Sheets

U.S. PATENT DOCUMENTS

| | | | |
|---|---|---|---|
| 6,209,098 B1 | 3/2001 | Davis | 712/194 |
| 6,215,402 B1 | 4/2001 | Rao Kodukula et al. | 340/572.8 |
| 6,220,516 B1 | 4/2001 | Tuttle et al. | 235/492 |
| 6,259,408 B1 | 7/2001 | Brady et al. | 343/700 |
| 6,262,664 B1 | 7/2001 | Maloney | 340/572.8 |
| 6,262,692 B1 | 7/2001 | Babb | 343/895 |
| 6,268,796 B1 | 7/2001 | Gnadinger et al. | 340/572.5 |
| 6,278,413 B1 | 8/2001 | Hugh et al. | 343/818 |
| 6,285,342 B1 | 9/2001 | Brady et al. | 343/895 |
| 6,303,958 B1 | 10/2001 | Kanaya et al. | 257/310 |
| 6,325,294 B2 | 12/2001 | Tuttle et al. | 235/492 |
| 6,330,971 B1 | 12/2001 | Mabry et al. | 235/383 |
| 6,375,780 B1 | 4/2002 | Tuttle et al. | 156/226 |
| 6,384,727 B1 | 5/2002 | Diprizio et al. | 340/572.7 |
| 6,424,263 B1 | 7/2002 | Lee et al. | 340/572.7 |
| 6,424,315 B1 | 7/2002 | Glenn et al. | 343/895 |
| 6,429,831 B2 | 8/2002 | Babb | 343/895 |
| 6,452,411 B1 | 9/2002 | Miller et al. | 324/765 |
| 6,478,229 B1 * | 11/2002 | Epstein | 235/492 |
| 6,487,681 B1 * | 11/2002 | Tuttle et al. | 714/25 |
| 6,496,113 B2 | 12/2002 | Lee et al. | 340/572.7 |
| 6,511,877 B2 | 1/2003 | Kanaya et al. | 438/240 |
| 6,518,885 B1 | 2/2003 | Brady et al. | 340/572.7 |
| 6,553,496 B1 | 4/2003 | Buer | 726/34 |
| 6,559,671 B2 | 5/2003 | Miller et al. | 324/765 |
| 6,646,328 B2 | 11/2003 | Tsai | 257/659 |
| 6,654,890 B1 | 11/2003 | Girard | 726/35 |
| 6,661,352 B2 * | 12/2003 | Tiernay et al. | 340/928 |
| 6,695,571 B1 | 2/2004 | Canella | 414/801 |
| 6,708,317 B2 | 3/2004 | Grisenthwaite | 716/4 |
| 6,727,817 B2 | 4/2004 | Maloney | 340/572.8 |
| 6,749,115 B2 | 6/2004 | Gressel et al. | 235/382 |
| 6,757,832 B1 | 6/2004 | Silverbrook et al. | 713/194 |
| 7,152,791 B2 * | 12/2006 | Chappidi et al. | 235/385 |
| 7,170,415 B2 * | 1/2007 | Forster | 340/572.4 |
| 7,229,018 B2 * | 6/2007 | Kurz | 235/441 |
| 7,239,238 B2 * | 7/2007 | Tester et al. | 340/539.31 |
| 7,253,735 B2 * | 8/2007 | Gengel et al. | 340/572.7 |
| 7,301,458 B2 * | 11/2007 | Carrender et al. | 340/572.1 |
| 7,342,498 B2 * | 3/2008 | Baba et al. | 340/572.5 |
| 7,479,880 B2 * | 1/2009 | Gubo | 340/572.1 |
| 7,481,917 B2 * | 1/2009 | Ikeyama et al. | 210/85 |
| 2003/0067396 A1 * | 4/2003 | Hassett | 340/825.49 |
| 2004/0074974 A1 * | 4/2004 | Senba et al. | 235/492 |
| 2004/0174260 A1 * | 9/2004 | Wagner | 340/568.1 |
| 2004/0184747 A1 * | 9/2004 | Koyasu et al. | 385/101 |
| 2005/0130389 A1 * | 6/2005 | Yamazaki et al. | 438/455 |
| 2005/0181530 A1 * | 8/2005 | Brugger et al. | 438/62 |
| 2006/0010685 A1 * | 1/2006 | Kobayashi et al. | 29/825 |
| 2006/0065744 A1 * | 3/2006 | Tai et al. | 235/492 |
| 2006/0118229 A1 * | 6/2006 | Ohashi et al. | 156/60 |
| 2006/0145870 A1 * | 7/2006 | Coveley et al. | 340/572.8 |
| 2006/0176154 A1 * | 8/2006 | Littlechild et al. | 340/10.5 |
| 2006/0181716 A1 * | 8/2006 | Hoshina | 358/1.1 |
| 2007/0008121 A1 * | 1/2007 | Hart | 340/540 |
| 2007/0029384 A1 * | 2/2007 | Atherton | 235/435 |
| 2007/0040686 A1 * | 2/2007 | Reis | 340/572.7 |
| 2007/0069895 A1 * | 3/2007 | Koh | 340/572.1 |
| 2007/0080783 A1 * | 4/2007 | Ghosh et al. | 340/10.1 |
| 2007/0103272 A1 * | 5/2007 | Alden | 340/10.2 |
| 2007/0115129 A1 * | 5/2007 | Kessler | 340/572.3 |
| 2007/0139057 A1 * | 6/2007 | Nguyen et al. | 324/602 |
| 2007/0169880 A1 * | 7/2007 | Nagae et al. | 156/238 |
| 2007/0171080 A1 * | 7/2007 | Muirhead | 340/572.8 |
| 2007/0229279 A1 * | 10/2007 | Yamazaki et al. | 340/572.7 |
| 2007/0240304 A1 * | 10/2007 | Eisenhardt et al. | 29/825 |
| 2007/0296554 A1 * | 12/2007 | Marcus et al. | 340/10.51 |
| 2009/0009333 A1 * | 1/2009 | Bhogal et al. | 340/572.1 |
| 2009/0027206 A1 * | 1/2009 | Chang et al. | 340/572.3 |
| 2009/0108996 A1 * | 4/2009 | Day | 340/10.1 |
| 2009/0251294 A1 * | 10/2009 | Kawamura et al. | 340/10.51 |

* cited by examiner

10

US 7,712,674 B1

RFID DEVICES FOR VERIFICATION OF CORRECTNESS, RELIABILITY, FUNCTIONALITY AND SECURITY

CROSS REFERENCE TO RELATED APPLICATION

This application claims the benefit of U.S. Provisional Patent Application No. 60/655,010 filed Feb. 22, 2005 and U.S. Provisional Patent Application No. 60/676,710 filed May 2, 2005 the entirety of which are both hereby incorporated by reference into this application.

BACKGROUND OF THE INVENTION

1. Field of the Invention

The present invention provides RFID device comprising a network of radio frequency identification (RFID) transceivers and antenna elements in different numbers, in various network sizes, in different configurations and on various substrates, a method for making the same and a method of using the RFID devices.

2. Description of Related Art

A radio-frequency identification (RFID) transceiver is a device that includes RF (radio frequency) circuits, control logic and memory, plus an antenna, all mounted on a supporting substrate. It receives an electronic signal, generates a response signal, and then transmits the response signal. RFID transceivers have been used to locate, identify and track merchandise palettes, shipping containers on a palette or individual items within a container, on a retailer shelf or in use by an end user. There are active and passive RFID transceivers. Active RFID requires a battery. A passive RFID draws its energy and transfers information in the form of low power radio waves resulting from illumination of the RFID reader.

RFID devices on flexible organic substrates with a typical overall thickness of about 1.5 mils are known and allow for applications of RFID technology. By giving RFID devices additional intelligence, they can be used to provide state information whenever probed by the RFID reader.

In U.S. Pat. Nos. 6,303,958; 6,511,877; 6,424,263; 6,496,113; 6,164,551; 6,220,516, 6,325,294; 6,375,780 and U.S. Pat. No. 6,424,315, semiconductor devices that simply have low cost RFID functionality through the benefit of integrated circuitry are described. U.S. Pat. No. 6,424,315 uses an antenna on top of the RFID IC with an insulating layer between the IC and antenna with a connection on top of the IC. Implementation of the antenna on the integrated circuit provides an RFID transceiver that is small in size, physically rugged, and relatively inexpensive.

U.S. Pat. No. 6,518,885 describes packaging for RFID semiconductor devices that allows for an ultra-thin height.

U.S. Pat. Nos. 6,285,342; 6,646,328; 6,107,920; 6,215,402; 6,268,796; 6,259,408; and 6,278,413 describe antennas that can effectively be used with RFID semiconductor devices.

U.S. Pat. Nos. 6,112,940, 6,135,291 and 6,695,571 and U.S. Pat. No. 6,330,971 describe tracking and sorting of semiconductor devices by using separate RFID devices associated with the wafer and the sorting bins.

U.S. Pat. Nos. 5,828,753 and 6,209,098 describe two integrated circuit chips with cryptographic engines used solely to encrypt outgoing information being output across the interconnect or to decrypt incoming information received from the interconnect. U.S. Pat. No. 5,920,690 describes access protection in an integrated circuit whereby access protection circuitry includes access attribute bits which are compared to the access attributes of a memory request. U.S. Pat. No. 6,097,225 discloses a validity circuit that is used with an analog circuit in a mixed signal system to determine whether the supply voltage is at an adequate voltage level to assure stable operation of the analog circuit. U.S. Pat. Nos. 6,452,411 and 6,559,671 disclose a system for testing integrated circuit devices in which a tester communicates with a known good device through a channel. U.S. Pat. No. 6,553,496 relates to security protection within an integrated circuit design and pertains particularly to integration of security modules on an integrated circuit so that operations cannot be probed or altered. U.S. Pat. No. 6,578,180 describes a method and system for testing interconnected integrated circuits. U.S. Pat. No. 6,757,832 pertains to an authentication chip protected from unauthorized modification by storing data in intermediate states of the multi-level flash memory between the minimum and maximum voltage level states. U.S. Pat. No. 6,749,115 describes a monolithic integrated circuit with dual public key cryptographic protected central processing units in a computing device. U.S. Pat. No. 6,708,317 relates to the validation of integrated circuit designs in which part of the design is obscured to maintain its confidentiality.

In addition, U.S. Pat. No. 6,654,890 describes a method to wirelessly authenticate laptops to prevent unauthorized users from being able to use the laptops. Also, many current car radios are disabled when removed from vehicles (i.e., the power supply) until the proper code is entered, to deter theft.

U.S. Pat. No. 6,478,229 describes packaging tapes with RFID devices in the tape to facilitate the use of the RFIDs to seal cartons or envelopes that are to be shipped or stored. U.S. Pat. Nos. 6,429,831 and 6,262,692 describe making a laminated article for use as an RFID label to place on cartons or envelopes that are to be shipped or stored. U.S. Pat. No. 6,140,146 describes processes and apparatus for manufacturing radio frequency transponders having substrates formed from a flexible tape or film. U.S. Pat. Nos. 5,831,531, 5,646,592 and 5,406,263 describe a simple trip-wire or magnetic circuit associated with a shipping container that provides continuity, which, if disabled by a forced entry of the container, an RFID tag would alert the owner or monitoring station. U.S. Pat. Nos. 6,727,817 and 6,262,664 describe the tamper detection and the prevention of separating a key (or other object) from its ID card, such as an RF tag or other circuitry for storing and transmitting an ID to a controller. The key and the ID card are connected by a tether. When the tether is cut, transmission of an ID code can no longer pass through the tether. U.S. Pat. No. 6,384,727 describes a way to capacitively power a radio frequency identification device.

The above-described patents concern using semiconductor and laminate technology to implement the RFID, antennas to be used with the RFID integrated circuits, putting RFID devices into tapes and labels, tracking and sorting semiconductors using separate RFID devices or non-RFID circuit methods of verifying the correctness, reliability, functionality and trustworthiness of integrated circuits, or providing a means to protect an IC or enclosure from reverse engineering, using single RFID devices to broadcast the unwanted separation or opening of objects. As discussed above, although some of these patents describe methods that can reduce the cost and size and ease of use of the RFID, it is desirable to provide further cost and size reduction for widespread deployment of RFIDs.

SUMMARY OF THE INVENTION

The present invention differs from the prior art in that the present invention provides one or a network of passive or active radio frequency identification (RFID) transceivers and antenna elements in different numbers, in various network sizes, in different configurations and on various substrates. The RFID transceiver can be co-located with standard semiconductor devices or printed circuit boards, for cost-effective circuit design and non-destructive fabrication test and analysis of integrated circuits and printed circuit boards after fabrication, and to locate, track and identify the integrated circuit, printed circuit boards and products in which they are implemented. The RFID transceivers can be coupled to substrates containing matter in gas, liquid, or solid form, such as medical devices like breast implants, for effective monitoring of the substrates to ensure that the substrate is in an unaltered state and the matter is still contained securely within. The RFID transceivers can be coupled to secure tapes of various lengths and widths and mesh bags or sheets of various sizes and they can be applied at the carton-level using them to locate, track and identify products in which they are implemented and/or the cartons in which they were placed.

The present invention provides a network of radio frequency identification (RFID) transceivers and antenna elements in different numbers, in various network sizes, in different configurations and on various substrates, a method for making the same and the process of using these RFID devices with features of:

using them for cost-effective circuit design and non-destructive fabrication test and analysis in order to verify the correctness, reliability, and functionality of integrated circuits and printed circuit boards after fabrication and ensure the widest coverage of trust issues for integrated circuits and printed circuit boards. The device in a package could be tested for functionality without opening the package or device. This would allow manufacturers, wholesalers, retail stores and service centers of all types to monitor for internal damage and repair issues at any time;

using them for cost effective monitoring of substrates containing matter in gas, liquid, or solid form, such as medical devices, for example, breast implants, to ensure that the substrate is in an unaltered state and the matter is still contained securely within in order to verify the correctness, reliability, and functionality of the substrate after fabrication, after implementation, such as in surgical implantation, and in long term application, for example, within the body. Furthermore, through the devices, an implant could be tested for unaltered functionality in the home or doctor's office with the use of an RFID reader. This would allow consumers or patients to cost effectively and regularly test the efficacy of the substrate containing matter and to seek technical or medical attention if needed;

using them for cost-effective creation of secure tapes of various lengths and widths and mesh bags or sheets of various sizes and applying them at the carton-level at the point of loading or "stuffing" to replace conventional, non-secure tapes and carton sealants;

locating, tracking and identifying the products in which they are implemented, themselves;

locating, tracking and identifying the cartons upon which they are used;

using them for protection against reverse engineering by permanently modifying or destroying an IC or printed circuit board if the IC or printed circuit board package or enclosure is opened without first providing a properly encoded signal from a user-specified RFID reader or a nested RFID connected to the radio frequency electronics enclosure. The presence of the proper encoded signal would allow access to the radio frequency electronics without alteration or destruction. Similarly, such a system could be used to either permanently or temporarily disable a device to deter theft, and using them to destroy or disable an electronic device, such as an IC or the subcomponent of a system upon command from an RFID probing device.

The invention will be more fully described by reference to the following drawings.

DETAILED DESCRIPTION

Figure 1:
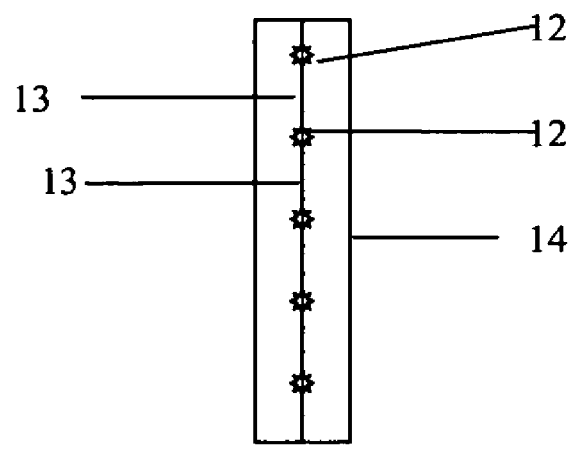
FIG. 1 is a schematic diagram of a first embodiment of a radio frequency identification (RFID) device comprising a tape.

Reference will now be made in greater detail to a preferred embodiment of the invention, an example of which is illustrated in the accompanying drawings. Wherever possible, the same reference numerals will be used throughout the drawings and the description to refer to the same or like parts.

Radio frequency identification (RFID) device 10 comprises a plurality of radio frequency identification RFID transceivers 12 coupled to one another with connectors 13 in a connected pattern on tape 14 as shown in FIG. 1. For example, connectors 13 can be electrical traces formed of metal or electrically conductive polymer materials. Alternatively, connector 13 can be a wireless connection. RFID transceivers 12 can include an integrated circuit chip and an antenna. Tape 14 can be formed of, for example, paper, a transparent film of a suitable polymer or plastic material such as polyethylene, polypropylene, polyester, polyamide, or polyethylene-therephthalate of various lengths and widths. Tape 14 can include an adhesive on one or more surfaces thereof.

Figure 2:
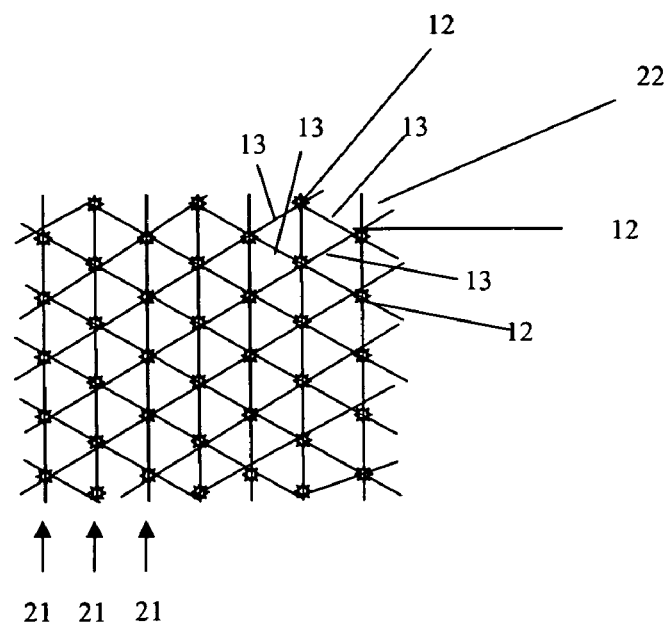
FIG. 2 is a schematic diagram of a second embodiment of a RFID device comprising a mesh bag.

In a second embodiment, as shown in FIG. 2, RFID device 20 comprises a plurality of RFID transceivers 12 networked to one another with connectors 13 in a connected network comprising a plurality of connected rows 21 of RFID transceivers 12 on mesh bag 22. Adjacent RFID transceivers 12 in the same or adjacent rows 21 are connected to one another in a mesh pattern. Mesh bag 22 can be formed in various sizes. Mesh bag 22 can be formed of, for example, polymer or plastic materials or synthetic fiber or natural fiber materials.

Figure 3:
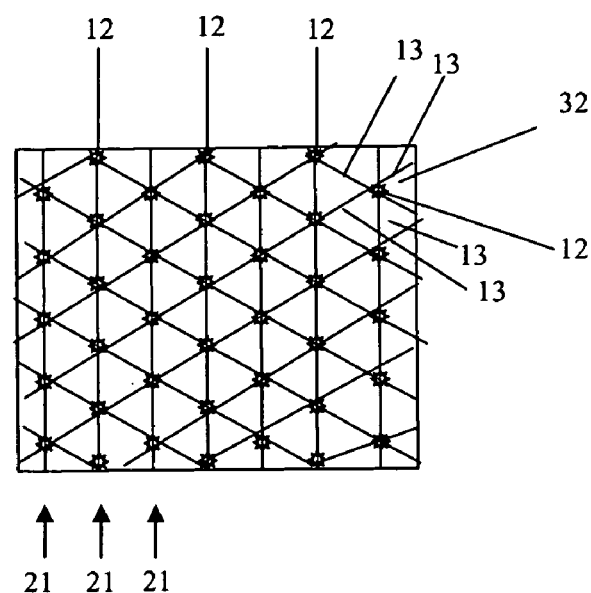
FIG. 3 is a schematic diagram of a second embodiment of a RFID device comprising a sheet.

In a third embodiment, as shown in FIG. 3, RFID device 30 comprises a plurality of RFID transceivers 12 networked to one another with connectors 13 in a connected network comprising a plurality of connected rows 21 of RFID transceivers 12 on sheet 32. Adjacent RFID transceivers 12 in the same or adjacent rows 21 are connected to one another in a mesh pattern. Sheet 32 can be formed in various lengths, widths and sizes. Sheet 32 can be formed of, for example, paper, polymer, plastic, transparent films, synthetic fibers, or natural fiber materials.

RFID transceivers 12 when illuminated can respond with either an "end" signal or a "middle" signal depending on whether RFID transceiver 12 is at the end or middle of tape 14 or mesh bag 22 or sheet 32. The state of being of RFID transceivers 12 at the end or middle of tape 14 or mesh bag 22 or sheet 32 can change and will change when tape 14 or mesh bag 22 or sheet 32 is cut or altered.

RFID transceivers 12 are arranged on tape 14, mesh bag 22 or sheet 32 at certain intervals, such as in a line along the run of tape 14 or in a mesh architecture along the run mesh bag 22 or sheet 32 and can be perpendicular to the run of tape 14, mesh bag 22 or sheet 32. The density of RFID transceivers 12 used on tape 14, mesh bag 22 or sheet 32 can be determined by the security level required.

RFID devices 10, 20 and 30 receive an encoded signal and generate probe signals along various connections 13 between and among RFID transceivers 12. RFID transceivers 12 generate particular signals based on whether connections 13 around them lead to other RFID transceivers 12 ("middle" signal) or do not ("end" signal).

RFID devices 10, 20, and 30 utilize probe-response signals that can be based on a secure challenge-response protocol to ensure that when a response is received, the device receiving the response to its challenge can be assured that the response was generated with authenticated verification of the intended device characteristics, i.e. it is necessary to be able to discriminate against devices which have been altered, but respond as if they have not. In addition, to prevent surreptitious probing of RFID transceivers 12 to attempt to learn information about the protected devices, the challenge-response protocol would produce a two-way authentication.

Figure 4:
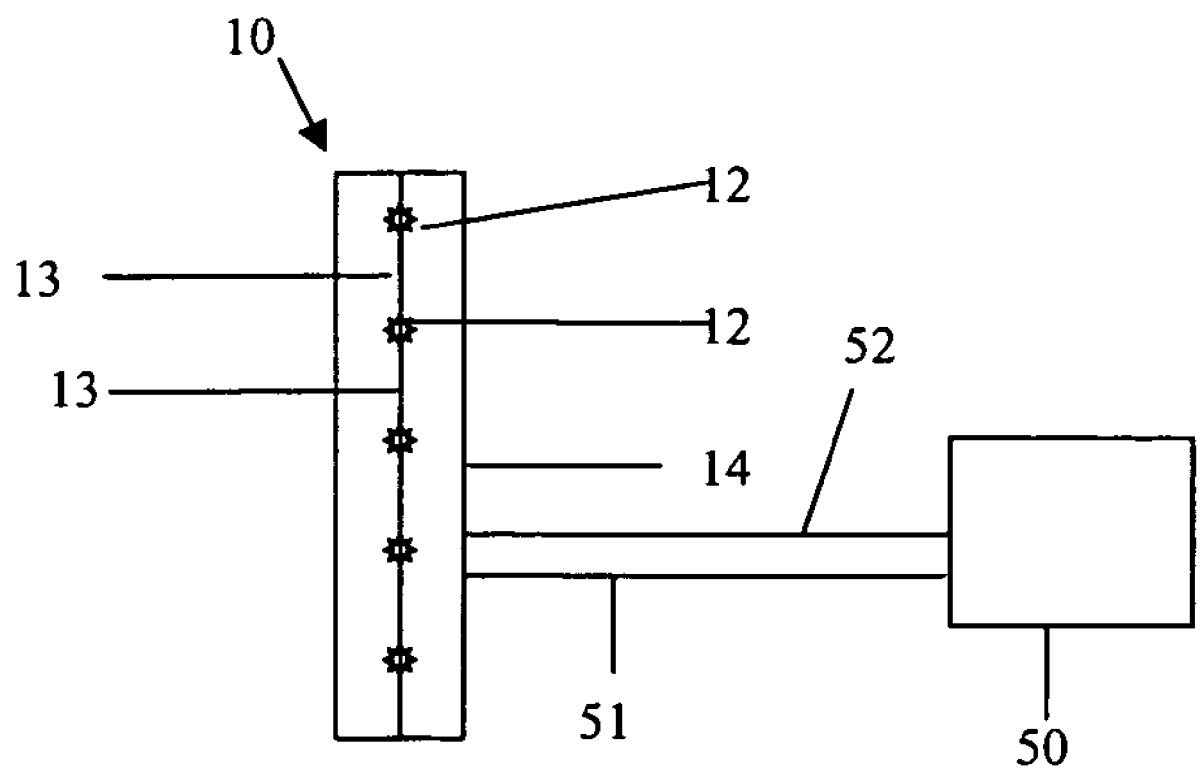
FIG. 4 is a schematic diagram of the connection of the RFID device to a probe device.

In one embodiment shown in FIG. 4, RFID device 10 would need to correctly respond to challenge 51 from probing device 50, and probing device 50 would need to demonstrate its identity by forming probing signal 52 to allow the RFID device 10 to verify authenticity. RFID devices 20 or 30 can also be used with probing device 50 in a similar manner as RFID device 10.

Figure 5:
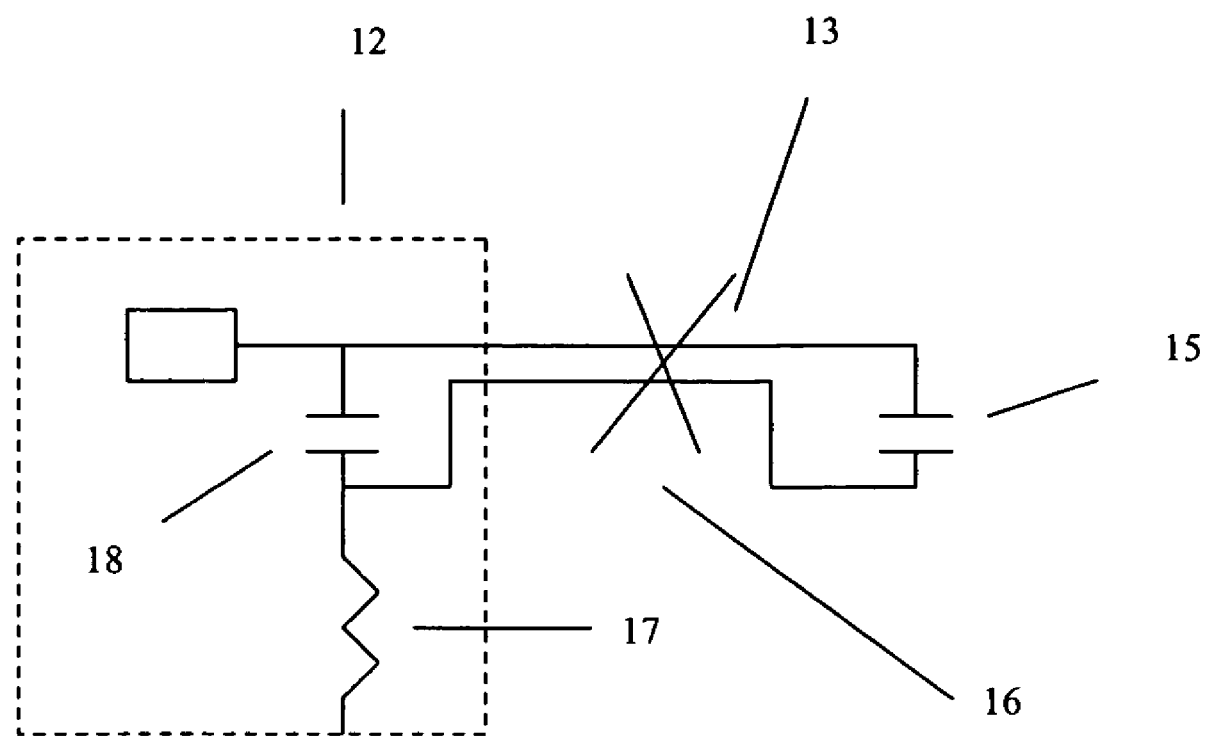
FIG. 5 is a schematic diagram of the RFID transceiver with an on-board capacitor that rapidly discharges when disconnected.

RFID devices 10, 20 or 30 can have on-board capacitor(s) on each RFID transceiver 12, as shown in FIG. 5 for one embodiment. The on-board capacitor 18 is much smaller than capacitor 15, such that capacitor 18 will discharge through resistor 17 much faster when capacitor 15 is disconnected by breaking connection 13, as shown with X 16. Thus, the on-board capacitors discharge when connections 13 are cut which would force the RFID response signal to be the "end" signal in order to preclude attempts to reconnect RFID tape 14 or mesh bag 22 or sheet 32 after cutting.

RFID devices 10, 20 or 30 can form the basis of an arming and monitoring system, which can exploit existing RFID reader networks and also provide a local communications ability for alerting.

In one embodiment, a method for using the RFID devices comprising tape 14 or mesh bag 22 or sheet 32 includes securing the carton with RFID devices 10, 20 or 30 at the point of loading or "stuffing" and can be used to verify what is being loaded into containers, added to containers and/or removed from containers. Additionally, upon arrival at a consolidation center, the cartons made secure by utilizing secure RFID devices comprising tapes or mesh bags or sheets can retain their security integrity off-loaded in consolidation centers for forwarding by other modes such as truck or rail. All this information can be easily shared through the use of the existing and ever growing RFID reader infrastructure.

Figure 6:
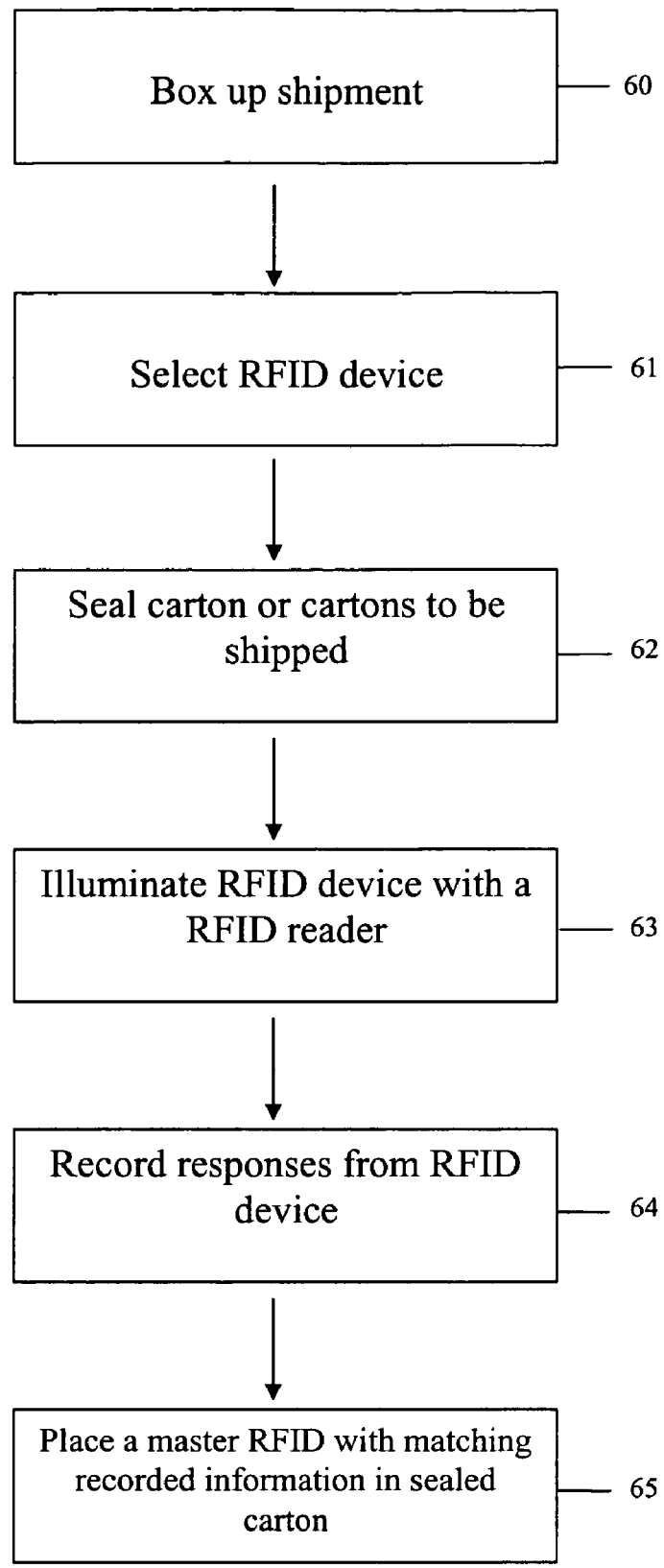
FIG. 6 is a flow diagram of a method of using the RFID device during shipping.
Figure 7:
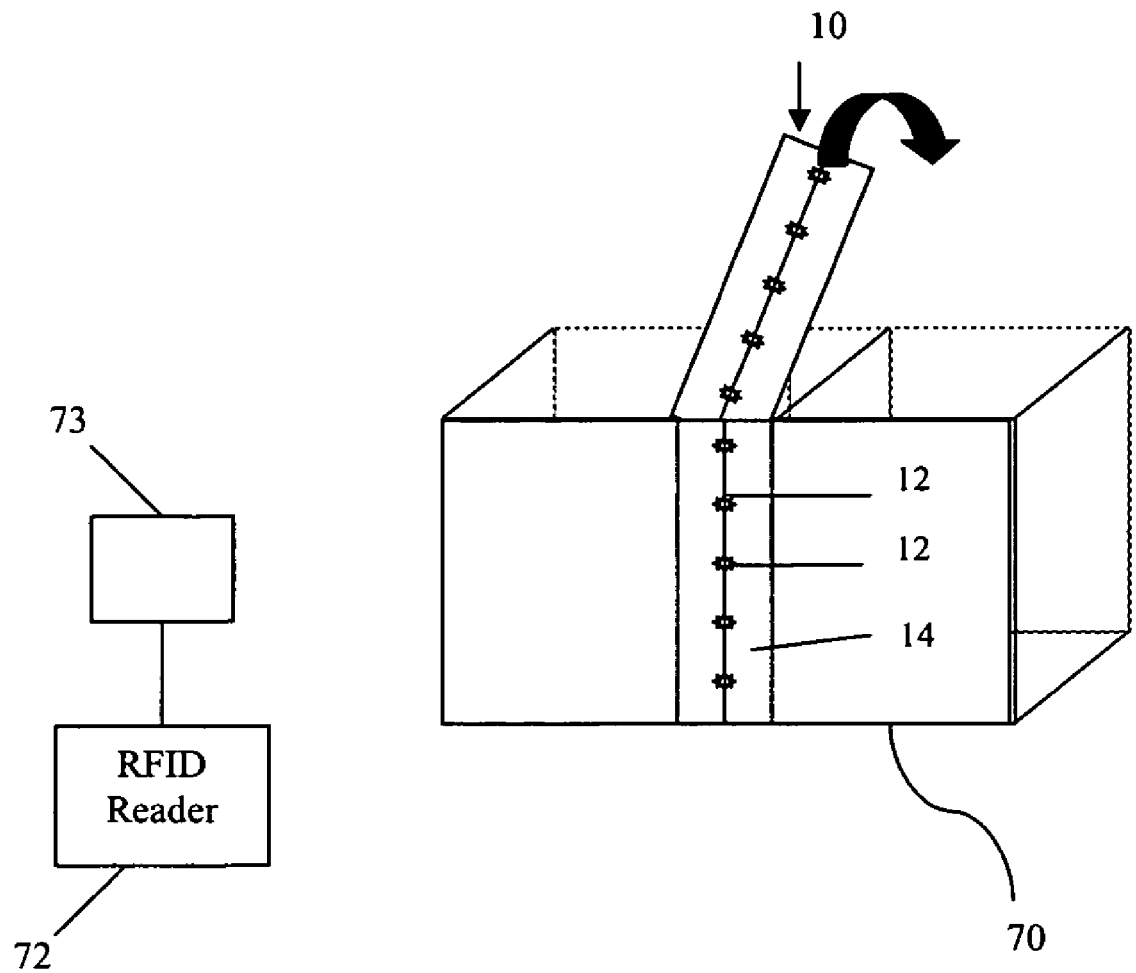
FIG. 7 is a schematic diagram of use of the RFID device comprising a tape.
Figure 8:
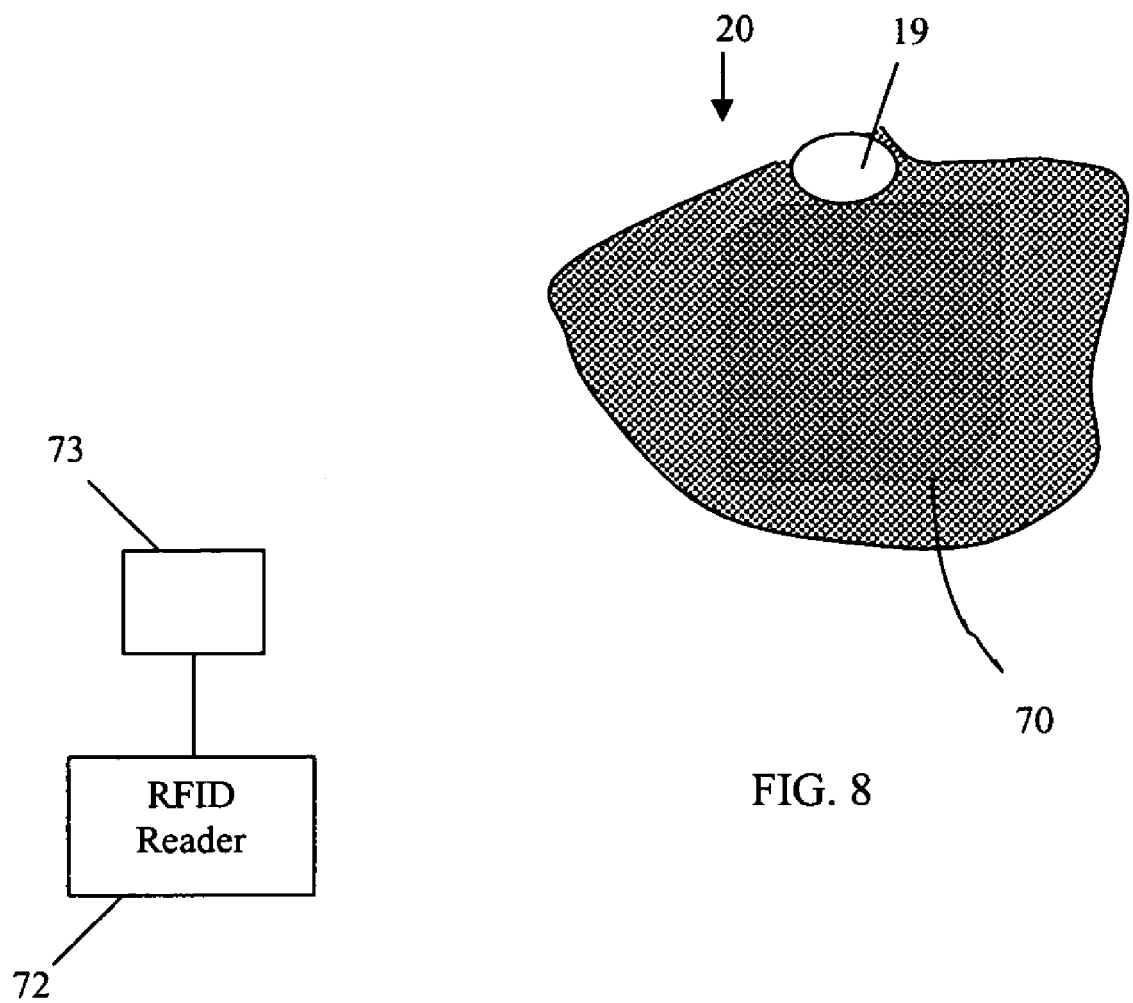
FIG. 8 is a schematic diagram of use of the RFID device comprising a mesh bag.
Figure 9:
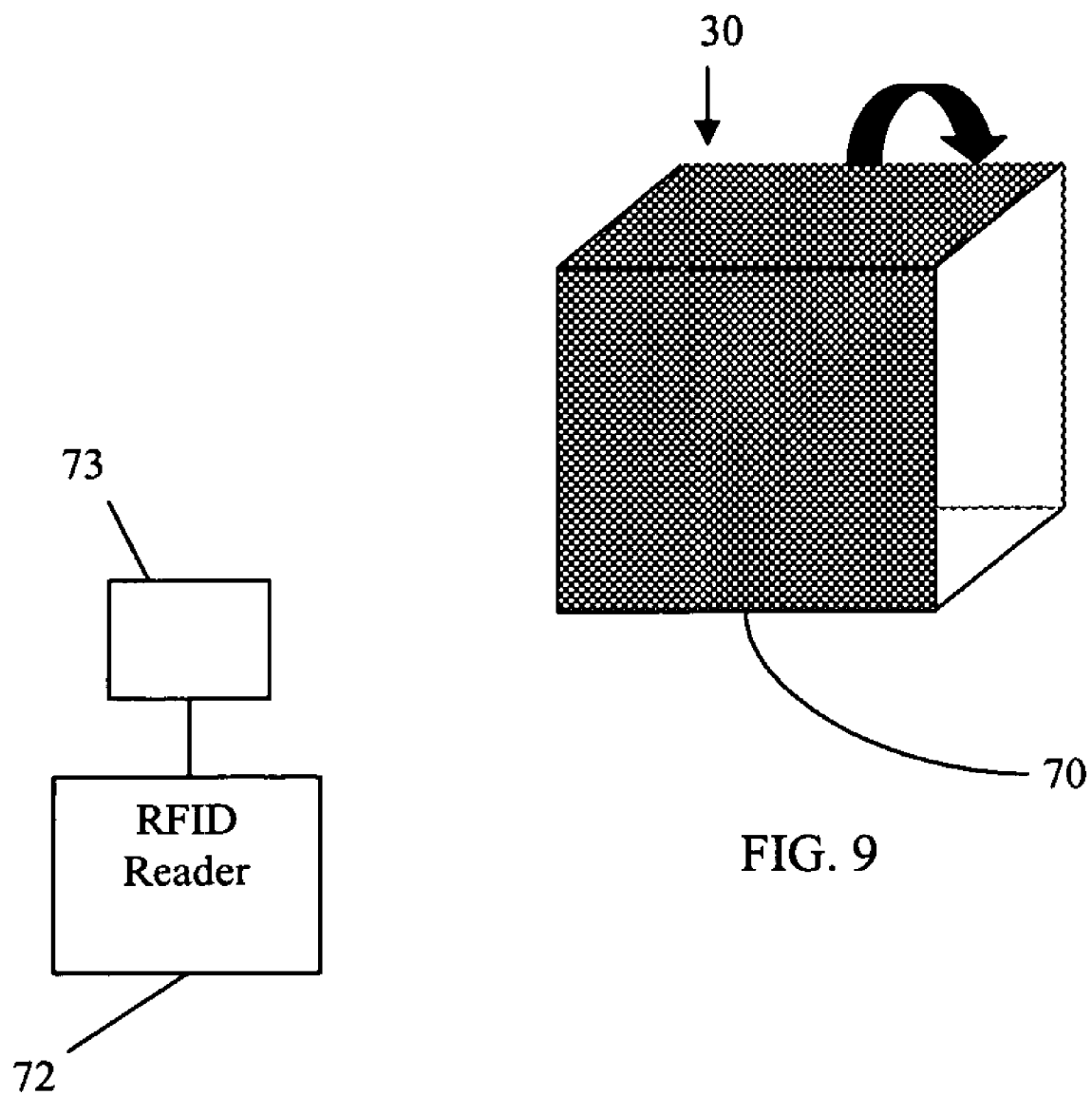
FIG. 9 is a schematic diagram of use of the RFID device comprising a sheet.

FIGS. 6-9 illustrate use of RFID devices 10, 20, or 30 at a shipper. At the point of loading or "stuffing", a shipper would box up its shipment as usual, as shown in block 60 of FIG. 6. In block 61, an appropriate RFID device 10, 20 or 30 is selected. In block 62, RFID device 10, as shown in FIG. 7, and/or RFID device 20, RFID device 30 as shown respectively in FIG. 8 and FIG. 9 are selected for use on carton(s) 70 to be shipped for sealing and securing carton(s) 70 for shipment to provide a secure carton. RFID device 10, 20 or 30, which are tape, mesh bag, with opening 18, and sheet, respectively, is affixed to fixed points on carton(s) 70 so that the normal opening of carton(s) 70 is impossible without breaking RFID device 10, 20 or 30 and the seal.

In block 63, carton(s) 70 with RFID device 10, 20 or 30 is illuminated by secure RFID reader 72. In block 64, responses and identifications from RFID transceiver 12 of RFID devices 10, 20 or 30 are recorded on a master RFID 73 and/or central location as shown in FIGS. 7-9.

Figure 10:
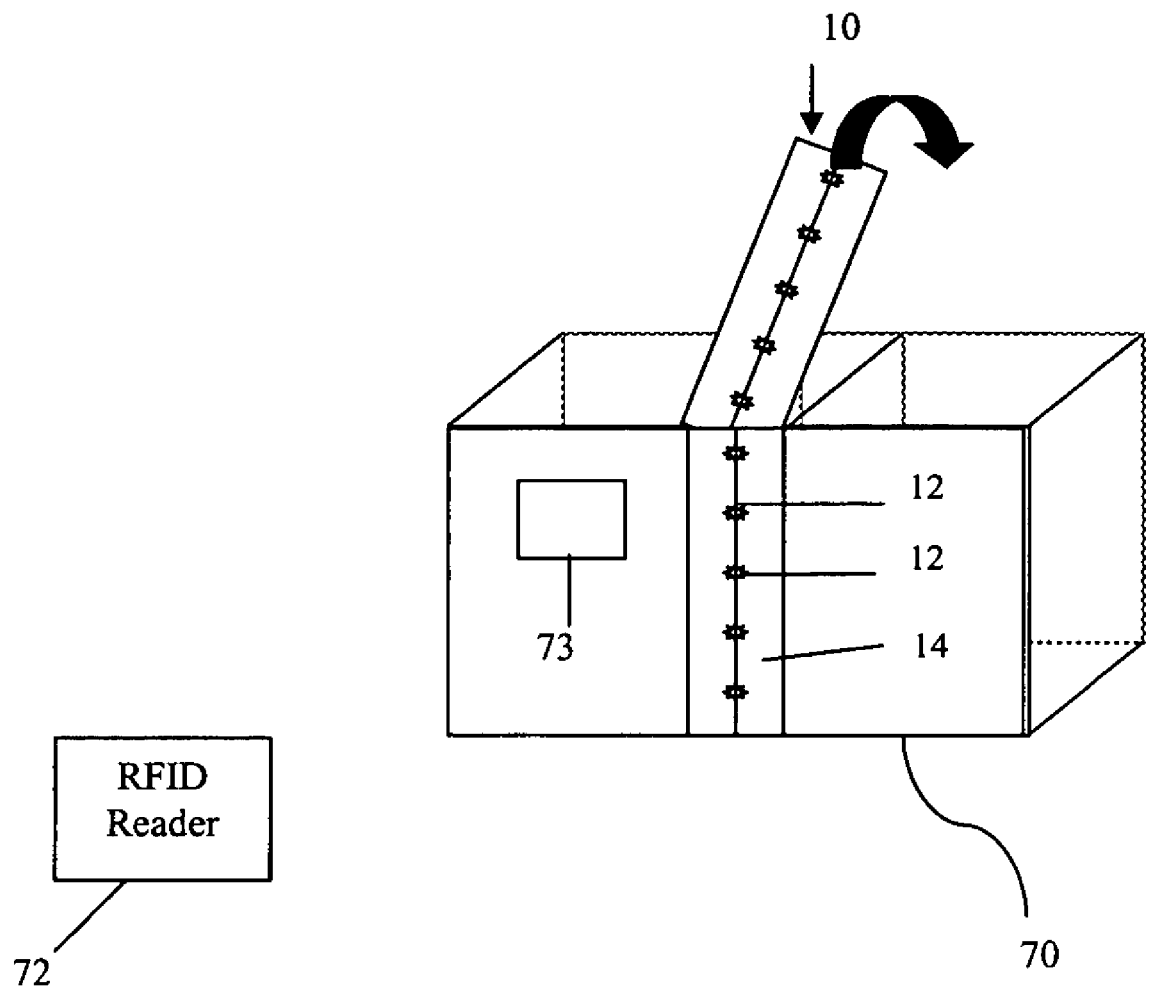
FIG. 10 is a schematic diagram of use of the RFID comprising a tape during shipping.

Referring to FIG. 6, in block 65, master RFID 73 with the matching summary information is attached or associated with carton(s) 70, as shown in FIG. 10. Master RFID 73 can also include nested RFID functionality for constantly sampling RFID devices 10, 20, or 30, comparing this information to its electronic manifest and reporting out its differences, to be used to check the contents and ensure security integrity at each stage.

Carton(s) 70 is placed in a container or transfer carton(s) 70 to a container consolidator. Upon arrival at the destination, carton(s) 70 would retain their attached RFID devices 10 and/or 20 and/or 30 and therefore can retain their security integrity to their final destination through the use of the existing and ever growing RFID reader infrastructure in the wholesale and retail distribution channels.

Figure 11:
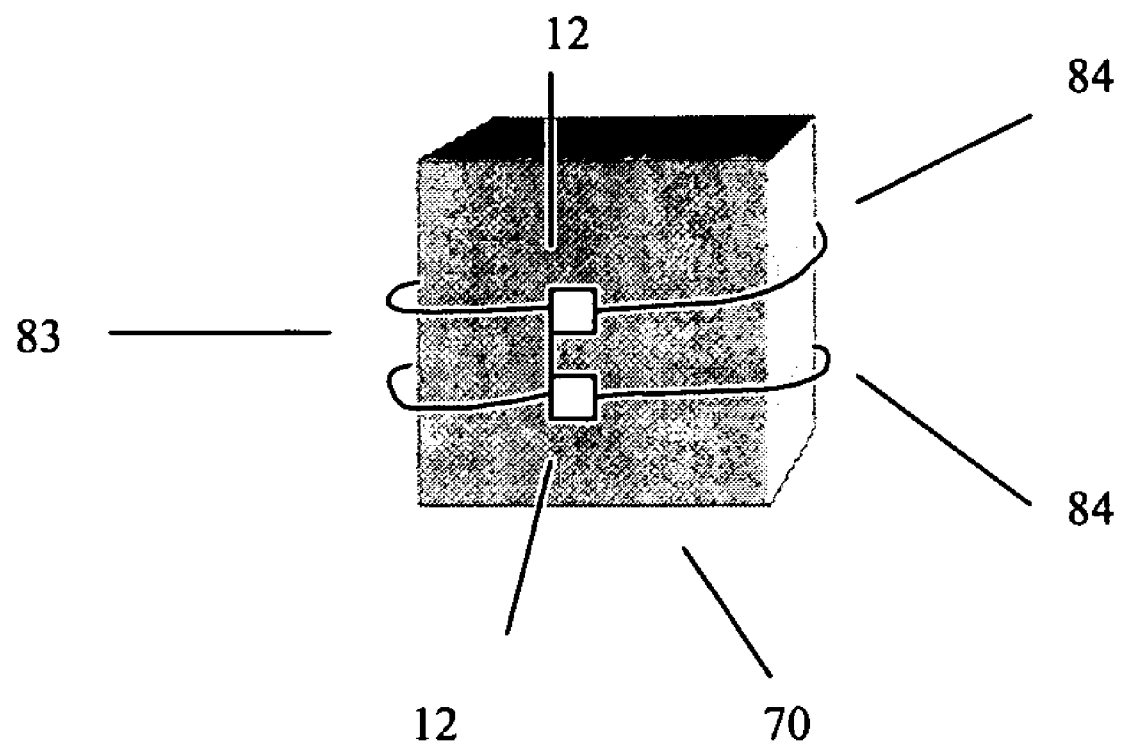
FIG. 11 is a schematic diagram of use of the RFID using loops for the connections.

In one embodiment as shown in FIG. 11, additional protection could be added comprising a selective interconnection 83 between selected grouped RFID transceiver 12. The interconnection could be routed through a series of loops 84 on carton(s) 70 such that opening carton(s) 70 for inspection and potential modification or removal of certain components would destroy selective interconnection 83, rendering RFID device 10 and/or RFID device 20 and/or RFID device 30 and its master RFID incapable of responding to an RFID probe correctly and making tampering evident.

Figure 12:
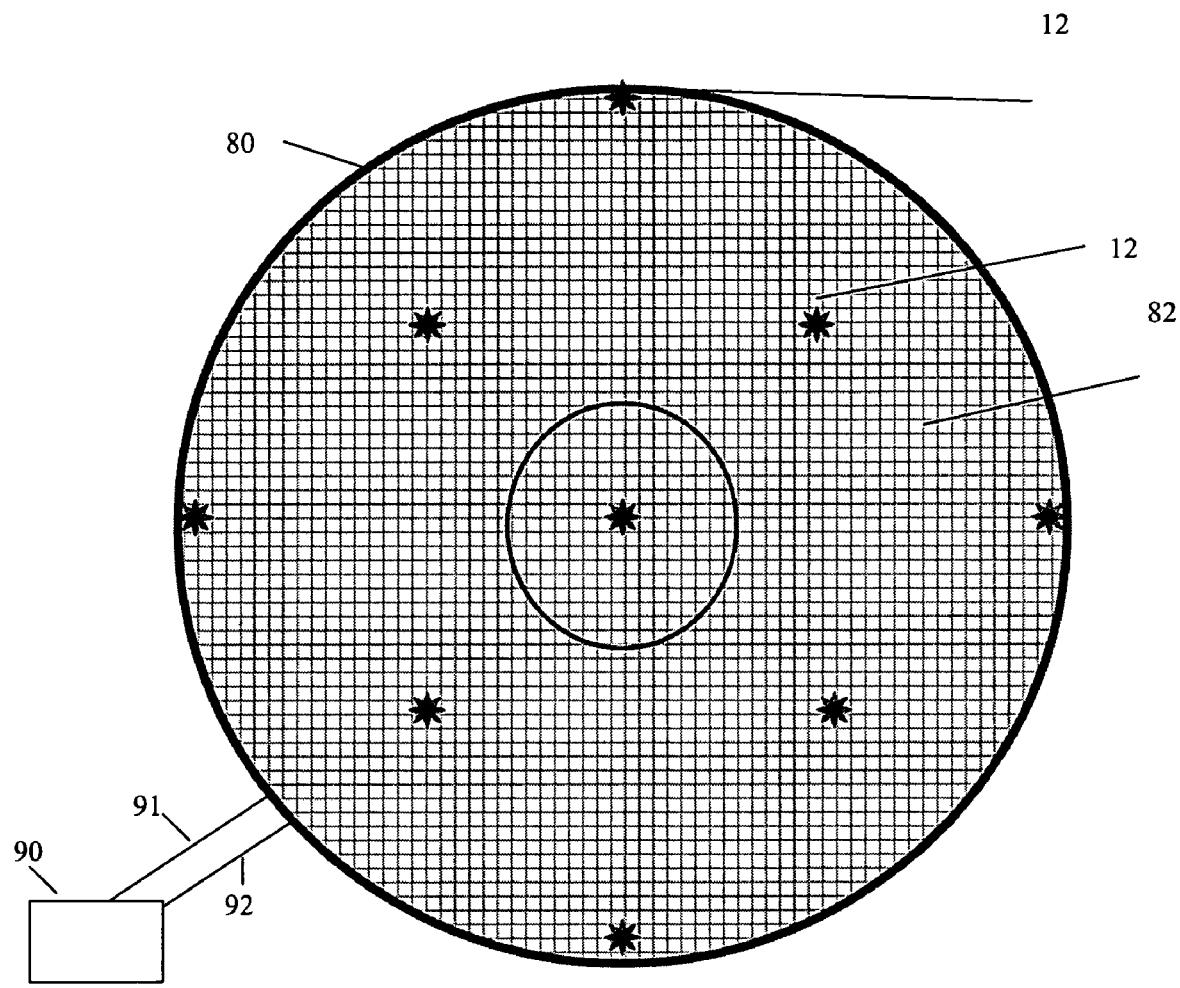
FIG. 12 is a schematic diagram a RFID device comprising a substrate.

In another embodiment of the present invention shown in FIG. 12, RFID device 80 comprises a plurality of radio frequency identification (RFID) transceivers 12 networked to one another in connected, wired or wireless, network patterns or groups on substrate 82 containing matter in gas, liquid, or solid form, such as medical devices, for example, breast implants. RFID device 80 ensures that substrate 82 is in an unaltered state and the matter is still contained securely within in order to verify the correctness, reliability, and functionality of substrate 82 after fabrication, after implementation, such as in surgical implantation, and in long term application, for example, within the body. In this embodiment, RFID transceiver 12 would be typically passive RFID devices.

RFID transceiver 12 can be arranged on substrate 82 at certain intervals. The density of the RFID transceiver 12 can be determined by the characteristics of substrate 82 and the accuracy of monitoring required.

RFID device 80 when illuminated by an encoded or unencoded signal from RFID reader 90 generates probe signals between and among the distributed RFID transceiver 12 and generates particular signals based on the impedance between them.

RFID device 80 can utilize probe-response signals that can be based on a secure challenge-response protocol so that when a response is received, the device receiving the response to its challenge can be assured that the response was generated with authenticated verification of the intended device characteristics, i.e., it is necessary to be able to discriminate against devices which have been altered, but respond as if they have not. In addition, to prevent surreptitious probing of RFID devices to attempt to learn information about the protected devices, the challenge-response protocol would produce a two-way authentication.

RFID device 80 would need to correctly respond to challenge 91 from RFID reader 90, and RFID reader 90 would need to demonstrate its identity by forming probing signal 92 that would allow RFID device 80 to verify authenticity.

Figure 13:
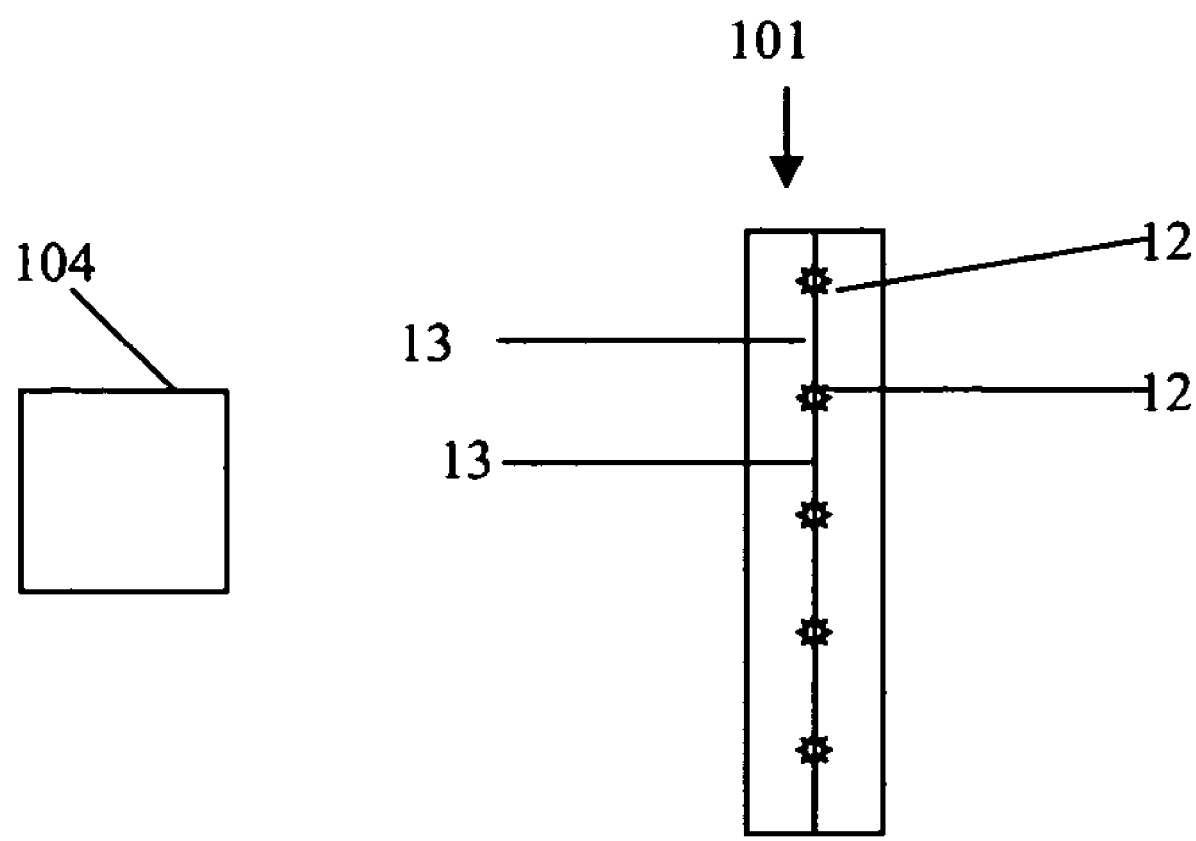
FIG. 13 is a schematic diagram of the RFID device comprising a semiconductor device.
Figure 14:
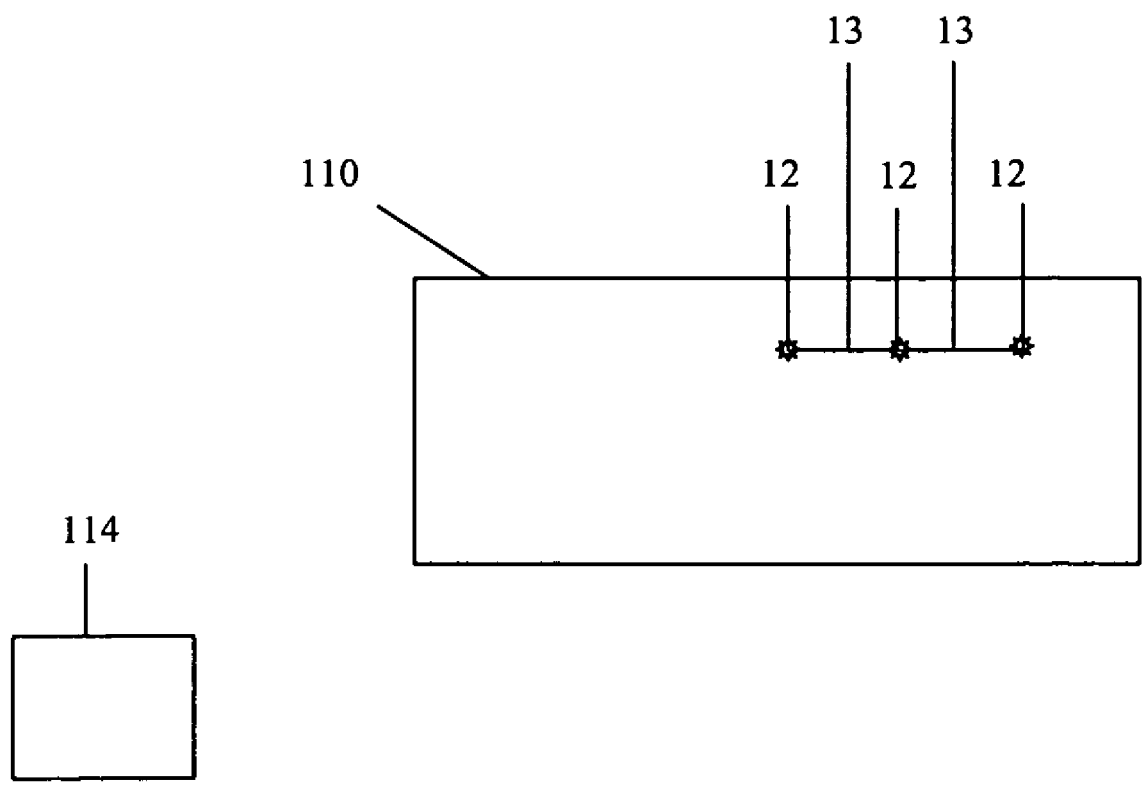
FIG. 14 is a schematic diagram of the RFID device comprising a printed circuit board.

In another embodiment, RFID transceiver 12 or a network of a plurality of RFID transceivers 12 are co-located with a conventional semiconductor device 101 as shown in FIG. 13. In one embodiment, RFID transceiver 12 or a plurality of networked RFID transceivers 12 are placed on printed circuit boards 110, as shown in FIG. 14. RFID transceivers 12 receive an encoded signal, generate probe signals along various integrated circuit traces, generate particular signals based on the response of the probe signals, and then transmit the particular response signal back to respective RFID reader 104 or 114. In this way, the correctness, reliability, and functionality of integrated circuits or printed circuit boards after fabrication can be verified to ensure that the various integrated circuit blocks and printed circuits function as designed and that additional circuitry or embedded functions have not been surreptitiously added to the integrated or printed circuit, i.e., to enable users to trust the integrated circuits they employ. The RFID probe-response signals generated can be based on a secure challenge-response protocol so that when a response is received, the device receiving the response to its challenge can be assured that the response was generated with authenticated verification of the intended device characteristics, i.e. it is necessary to be able to discriminate against devices which have been altered, but respond as if they have not.

Furthermore, the encoded signals can be used to protect semiconductor device 101 or printed circuit board 110 from reverse engineering. If semiconductor device 101 or a package of semiconductor device 101 or printed circuit board 110 is opened or probed without RFID transceiver 12 first receiving the proper encoded signal, either from a user-specified RFID reader or a nested RFID connected to the radio frequency electronics enclosure then RFID transceiver 12 can send out signals to permanently modify or destroy semiconductor device 101 or printed circuit board 110. The presence of the proper encoded signal would allow access to the radio frequency electronics without alteration or destruction. Similarly, such a system could be used to either permanently or temporarily disable a device to deter theft.

The encoded signal from an RFID probing device could also be used to signal the embedded RFID device to cause a change in the operation of the associated semiconductor device 101 or subsystem. For instance, signal traces within semiconductor device 101 or printed circuit board 110 could be disabled or harmful voltages applied to the device with the purpose of causing its destruction. This mode of operation would be similar to that described above for preventing probing or reverse engineering of semiconductor device 101 or printed circuit board 110, but would be carried out as a direct result of an authorized user or process' command.

Additionally, once it is possible to co-locate an RFID transceiver with a standard semiconductor device and/or RFID transceivers are placed on printed circuit boards, it is also then possible to locate, identify and track these items with RFID technology throughout the logistics process as stand-alone products and throughout the logistics process as elements within high value products for which they form the basis. Through repetitive logistics usage, RFID transceivers can also be cost-effectively applied to less voluminous, high value semiconductor products and semiconductor-based products to exploit the efficiency and effectiveness benefits of RFID technology.

The present invention provides the following:

1. A network of radio frequency identification (RFID) transceivers and antenna elements in different numbers, in various network sizes, in different configurations and on various substrates for cost-effective circuit design and non-destructive fabrication test and analysis to verify the correctness, reliability, and functionality of integrated circuits and printed circuit boards after fabrication and ensure the widest coverage of trust issues for integrated circuits and printed circuit boards. The device in the package has the RFID embedded such that the device can be tested for functionality without opening the package or device, allowing manufacturers, wholesalers, retail stores and service centers of all types to monitor for internal damage and repair issues at any time.

2. A network of radio frequency identification (RFID) transceivers and antenna elements in different numbers, in various network sizes, in different configurations and on various substrates using them for cost effective monitoring of substrates containing matter in gas, liquid, or solid form, such as medical devices like breast implants, to ensure that the substrate is in an unaltered state and the matter is still contained securely within in order to verify the correctness, reliability, and functionality of the substrate after fabrication, after implementation, such as in surgical implantation, and in long term application, for example, within the body. Furthermore, through the devices, an implant could be tested for unaltered functionality in the home or doctor's office with the use of an RFID reader. This would allow consumers or patients to cost effectively and regularly test the efficacy of the substrate containing matter and to seek technical or medical attention if needed.

3. A network of radio frequency identification (RFID) transceivers and antenna elements in different numbers, in various network sizes, in different configurations and on various substrates for cost-effective creation of secure tapes of various lengths and widths and mesh bags or sheets of various sizes and applying them at the carton-level at the point of loading or "stuffing" to replace standard, non-secure tapes and carton sealants.

a. locating, tracking and identifying the products in which they are implemented, themselves;

b. locating, tracking and identifying the cartons upon which they are used;

4. A network of radio frequency identification (RFID) transceivers and antenna elements in different numbers, in various network sizes, in different configurations and on various substrates for protection against reverse engineering by permanently modifying or destroying an IC or printed circuit board if the IC or printed circuit board package or enclosure is opened without first providing a proper encoded signal from a user-specified RFID reader or a nested RFID connected to the radio frequency electronics enclosure.

a. Using a properly encoded signal to allow access to the radio frequency electronics without alteration or destruction, but either permanently or temporarily disabling a device if tampered with or opened without the encoded signal.

b. Using a command from an RFID probing device to destroy or disable an electronic device, such as an IC or the subcomponent of a system.

5. A method for making the above and the process of using these RFID devices as above.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A radio frequency identification (RFID) system comprising:
  an RFID device securing a carton, said device comprising a substrate comprising a plurality of RFID transceivers operatively networked to one another in a fixed, repeated pattern, wherein each of said RFID transceivers generates a response signal, wherein each response signal comprises either an end signal or a middle signal, wherein an end signal provides information indicating that a given RFID transceiver is at an end of said fixed, repeated pattern and is operatively connected to only one other of said RFID transceivers, and wherein a middle signal provides information indicating that a given RFID transceiver is not at an end of said fixed, repeated pattern and is operatively connected to at least two other of said RFID transceivers, and wherein each RFID transceiver comprises an on-board capacitor, said capacitor discharging upon a disconnection with said networked transceivers to force a disconnected said RFID transceiver to change its response from a middle signal to an end signal;
  a master RFID device attached to said carton and operative to sample said plurality of RFID transceivers for middle and end signals for ensuring integrity, wherein said master RFID device is operative to determine whether a disconnection has occurred by determining whether there is a discrepancy between a number of sampled end and middle signals recorded at said master RFID device and a number of end and middle signals pre-stored in an electronic manifest.

2. The RFID system of claim 1 wherein each of said plurality of RFID transceivers generate a probe signal along a connection between an adjacent one or more of the RFID transceivers and said end signal and middle signal are determined by said probe signal.

3. The RFID system of claim 1 further comprising a probing device communicating with said RFID device responding to a challenge from said probing device.

4. The RFID system of claim 3 wherein a two-way authentication is used between said probing device and said RFID device.

5. The RFID system of claim 1 wherein said fixed repeated pattern comprises a plurality of rows of said RFID transceivers networked to one another.

6. The RFID system of claim 5 wherein said fixed repeated pattern comprises said RFID transceivers networked to one another in a grid configuration.

7. The RFID system of claim 1 wherein the number of RFID transceivers used in the RFID device is determined by a security level of said RFID device.

8. The RFID system of claim 1 wherein said fixed repeated pattern is on a sheet.

9. A method of securing a carton comprising the steps of:
  sealing said carton using an RFID device, said RFID device comprising a substrate comprising a plurality of RFID transceivers operatively networked to one another in a fixed, repeated pattern wherein said RFID device seals said carton such that said carton cannot be opened without breaking said RFID device and seal;
  sampling said transceivers of said RFID device for ensuring security integrity via a master RFID device attached to said carton, wherein each transceiver responds to said sampling with either an end signal or a middle signal wherein an end signal provides information indicating that a given RFID transceiver is at an end of said fixed, repeated pattern and is operatively connected to only one other of said RFID transceivers, and wherein a middle signal provides information indicating that a given RFID transceiver is not at an end of said fixed, repeated pattern and is operatively connected to at least two other of said RFID transceivers, and wherein each RFID transceiver comprises an on-board capacitor, said capacitor discharging upon a disconnection between said networked transceivers to force a disconnected said RFID transceiver to change its response from a middle signal to an end signal;
  determining whether disconnection has occurred, via said master RFID device determining whether there is a discrepancy between a number of sampled end and middle signals recorded at said master RFID device and a number of end and middle signals pre-stored in an electronic manifest.

10. The RFID system of claim 1 wherein said RFID transceivers are coupled to a substrate.

* * * * *